A. RYDEN & C. H. STAHL.
LOCK NUT.
APPLICATION FILED NOV. 4, 1912.
1,163,177.
Patented Dec. 7, 1915.
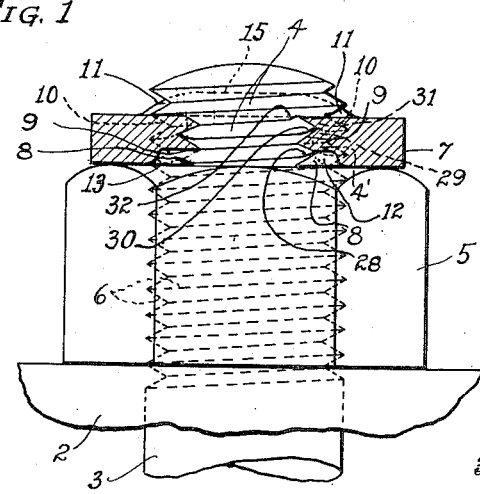
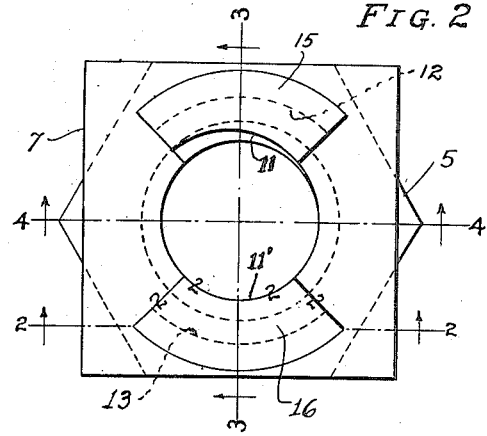
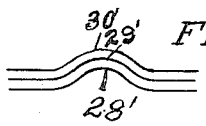
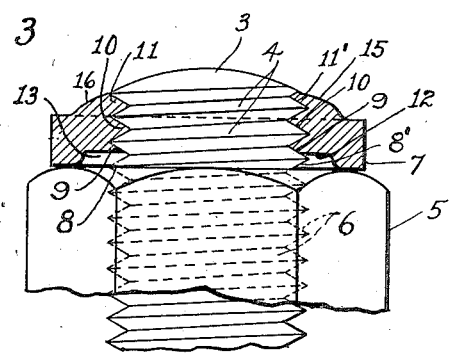
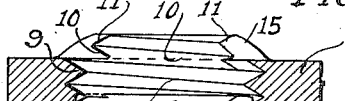
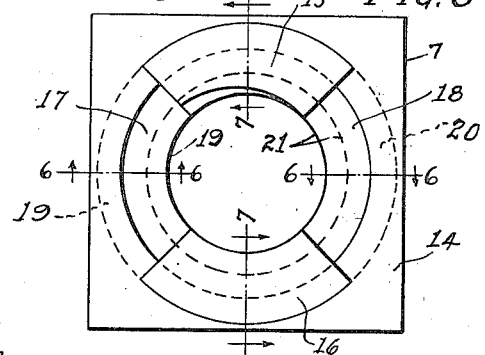
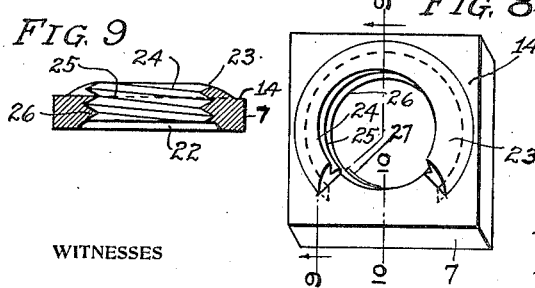
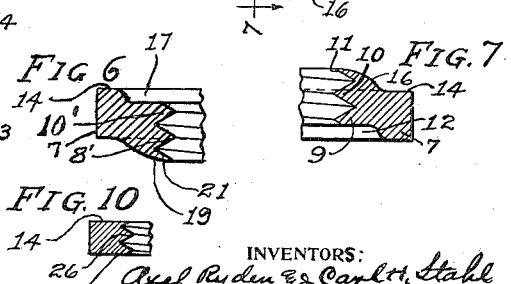
WITNESSES
INVENTORS:
Axel Ryden & Carl H. Stahl
BY
ATTORNEY

UNITED STATES PATENT OFFICE.

AXEL RYDEN AND CARL H. STAHL, OF CHICAGO, ILLINOIS.

LOCK-NUT.

1,163,177.

Specification of Letters Patent.   Patented Dec. 7, 1915.

Application filed November 4, 1912.   Serial No. 729,285.

*To all whom it may concern:*

Be it known that we, AXEL RYDEN and CARL H. STAHL, the former a citizen of the United States and the latter a subject of the King of Sweden, both residents of the city of Chicago, county of Cook, and State of Illinois, have invented certain new and useful Improvements in Lock-Nuts, of which the following is a specification.

Our invention relates to nut-locks, and its objects are to provide a nut-lock in the nature of a self-locking nut, or a nut having threads which interlock themselves with the thread or threads of a bolt when the nut or lock is tightened; to provide a construction wherein a comparatively thin disk having a thickness barely sufficient to carry one or two threads may be provided with additional threads, or thread-sections, by moving a portion or portions of the thread or threads for which the thickness of the disk provides, as it were, by die-operation upon said disk; to provide a disk-form of threaded nut-lock having sufficient threaded engagement, or disposition of the thread-engagement, to make said lock serve both as the nut and the lock.

Our invention is distinguished from locking disks which depend upon frictional engagement alone, in that it provides one or more positive stops against a loosening movement of the lock, and is adapted for locking several threads of the nut or nut-lock upon a corresponding number of threads upon the bolt.

Other advantages of the invention will appear from a detailed description and the drawings, in which—

Figure 1 is an elevation representing an apertured part engaged by a bolt, a bolt, a nut on said bolt, and a lock-nut embodying our invention shown in section taken substantially on line 2—2 of Fig. 2 after the lock has bee tightened to bend the threads. Fig. 2 is a plan view of the nut and lock nut shown in Fig. 1. Fig. 3 is a section taken substantially on line 3—3 of Fig. 2. Fig. 4 is a section taken substantially on line 4—4 of Fig. 2. Fig. 5 is a plan view of a modified form of lock-nut wherein depressions and raised portions are formed in both faces of the lock-nut instead of in only one, as in Figs. 1, 2 and 3. Fig. 6 is a section taken on either of the lines 6—6 on Fig. 5. Fig. 7 is a similar section on either of lines 7—7 of Fig. 5. Fig. 8 is another modification showing a single depression on one side and a single raised portion on the other side of the disk forming the nut-lock. Fig. 9 is a section taken on line 9—9 of Fig. 8. Fig. 10 is a section taken on line 10—10 on Fig. 8. Fig. 11 is a diagrammatic view of three bolt threads, showing by somewhat exaggerated curves substantially the manner in which the lock-nut and bolt threads are interlocked.

In the several views, 2 represents a part or plate having a bolt hole therein engaged by a bolt 3 with threads 4 engaged by a nut 5 with threads 6 and a lock-nut or threaded disk provided with four threads, or thread-sections, 8, 9, 10, and 11 in Figs. 1 to 4. These threads form arcs of about a quarter circle each at the bottom and top of the body of the disk, the intermediate thread or threads completing the usual circle. The body of the disk, washer or lock-nut is designated as 7 throughout all of the views and its threads as 8, 9, 10 and 11. The interrupted threads are distinguished by the labeling 8 and 11 at one side of the lock-nut and 8' and 9' at the other side where they are substantially continued. In Figs. 1 to 4 the uppermost thread or threads, is or are formed in pressed-out portions through the part of the disk in which the threads are located. Recesses 12 and 13 are stamped in the under-side of the disk or washer by forcing out the metal by dies to form bulges or raised portions 15 and 16, respectively, which carry the threads 11 and 11', or whatever number of segmental threads these raised portions will carry. Forming the recesses 12 and 13, the relative size and appearance of which are shown by the raised portions 15 and 16 in Fig. 2, removes a part of the inner periphery of the nut or innermost thread or threads, and the size of these thread-sections or interrupter threads as to length will be the distance between the recesss 12 and 13 or the bulges 15 and 16. The innermost thread, if the recess cuts but one thread, will, as it were, be transferred partly to a place beyond the opposite face of the nut, and what remains after the recesses have been made are sections 8 and 8' of the innermost thread. The transferred part of the thread 8 and 8' appears on top of the disk as 11 and 11'.

In the modification shown in Figs. 5, 6 and 7 the body of the lock-nut, or disk 7, is pressed out from both the top and bottom faces, thus duplicating in each face of the disk the formations on both faces of the disk in Figs. 1 to 4, inclusive. The recesses 12 and 13 are in Figs. 5, 6 and 7 made as recesses 17 and 18 in the upper face of the disk thereby producing projections 19 and 20 on the bottom face of the disk which are duplicates of the projections 15 and 16 on the top face of the disk. The upper face of the disk is distinguished as 14, although in the construction shown in Figs. 5, 6 and 7 both faces look substantially alike. The additional thread-sections provided for by the downward projections 19 and 20 are labeled 21 and 21′ and are like 11 and 11′. As the threads 21 and 21′ are substantially transferred sections cut out of the thread 10 in Figs. 1 to 4, said thread 10 is distinguished in Figs. 6 and 7 as sections 10 and 10′.

The Figs. 8 and 9 modification, augmented by Fig. 10, shows a single depression on the under-side and a corresponding raise on the upper side, the depression and raise in this instance describing about three-fourths of the circle. This longer depression is labeled 22 and the raise 23. The thread on the raised portion is indicated as 24. As the remaining threads on the Figs. 8 to 10 modification are associated with a form of raise and depression different from the other figures, said remaining threads are labeled 25, 26 and 27. The thread 27 is substantially the same as 8, 8′, 21 and 21′, being the first thread to engage the bolt threads, and, like its counterpart in the other views, is a wedge-thread which operates as a wedge upon the bolt-thread disappearing into the nut and distorts or raises said bolt-thread together with the lock-nut threads above and the bolt-threads engaged by them. This wedge-thread is forced between the nut 5 and the bolt-thread.

Referring to Fig. 1, the curving or bending of the threads is caused by the lowest thread, which is a thread section 8 or 8′ of about a quarter circle. This lowest thread when it touches the nut, or the part 2, if the nut 5 is dispensed with, enters the wedge-like space between the bolt-thread and the edge of the bolt-opening in 5 or 2, and by continued turning of the lock-nut to tighten it the bolt-thread operated upon by the wedge-thread is forced upward at the point where it is engaged by the wedge. The upward bending of the bolt-thread will cause the latter to bend up the next higher lock-nut-thread, and the lock-nut thread thus bent will bend the bolt-thread immediately above it. This operation will continue until the uppermost lock-nut thread has been bent up and forced with it the overlying bolt-thread. As the wedge-thread operates in a vertical plane which passes between the ends of the raised portions 15 and 16 in the Figs. 1 to 4 construction the upward bulges on the threads will lie between the ends of the raised portions 15 and 16. While it is not necessary to produce more than a very slight distortion in order to produce a lock, if the upward bendings are continued to the last thread above the wedge-thread the uppermost bent bolt-thread will have its upward bend between the ends of the projections 15 and 16 and will form an impassable barrier to the rotation of said ends. As the wedging operation of, say, wedge-thread 8 causes the lock-nut to rise on the bolt when the threads of the latter are bent upwardly, the effect produced on the bolt-threads and lock-nut threads above said wedge-thread 8 will also cause the wedge-thread 8′ to bend the bolt-threads overlying it, etc.

In Fig. 1 the operation of the wedge-thread 8 is shown, and as the effect on the opposite side over 8′ will be substantially the same a description of the operation of the thread 8 will suffice for 8′. The upward bend produced by the wedge thread 8 is in Fig. 1 designated as 28. The bend 28 on the bolt-thread when it engages the lock-nut thread immediately above will produce an upward bend 29 in the lock-nut thread 9. Continuing the upward force the bend 29 will produce a bend 30 in the next higher bolt-thread, the bend 30 makes a bend 31 on the lock-nut thread 10, and as the latter thread bend is not opposed by a lock-nut thread it will be the last one and between the ends of the raised portions 15 and 16.

In the construction shown in Figs. 5, 6 and 7 the threads 21 and 21′ on the lower bulges 19 and 20 operate as the wedge-threads and the uppermost bulge in the lock-nut will take place in each of the recesses 17 and 18 the ends of which would form stops to engage the uppermost bulge if the operation is carried that far. The construction shown in Figs. 5, 6 and 7 affords a better wrench-hold, as the lock-nut body is raised from the surface of the nut or part it engages.

In Figs. 8 and 10 27 is the wedge-thread.

Fig. 11 is a diagrammatic emphasis of the practical effect of the operation above described, 28′ representing the bolt thread engaged by the lock-nut wedge-thread and 29′, and 30′ representing the remaining bolt-threads operated upon by the lock-nut threads.

Having thus described our invention, we claim as new and desire to secure by Letters Patent—

A lock nut comprising an apertured plate having one or more depressions in one face only and adjacent to the bore thereof, and one or more raised portions on the opposite face of the plate directly opposite the said depression or depressions, the main body of the plate and said raised portion or portions being continuously threaded, the faces of the portions of the nut between said depression or depressions and raised portion or portions remaining in the planes of the outer and inner faces of the body of the nut, the peripheral faces of the plate being plane and their edges straight.

In testimony whereof we have hereunto set our hands in the presence of two subscribing witnesses.

AXEL RYDEN.
CARL H. STAHL.

Witnesses:
FREDRICK MALM,
J. W. BECKSTROM.